Sept. 7, 1943.    E. W. REMBERT    2,329,000
PIPE COUPLING AND METHOD OF MAKING THE SAME
Filed July 17, 1940
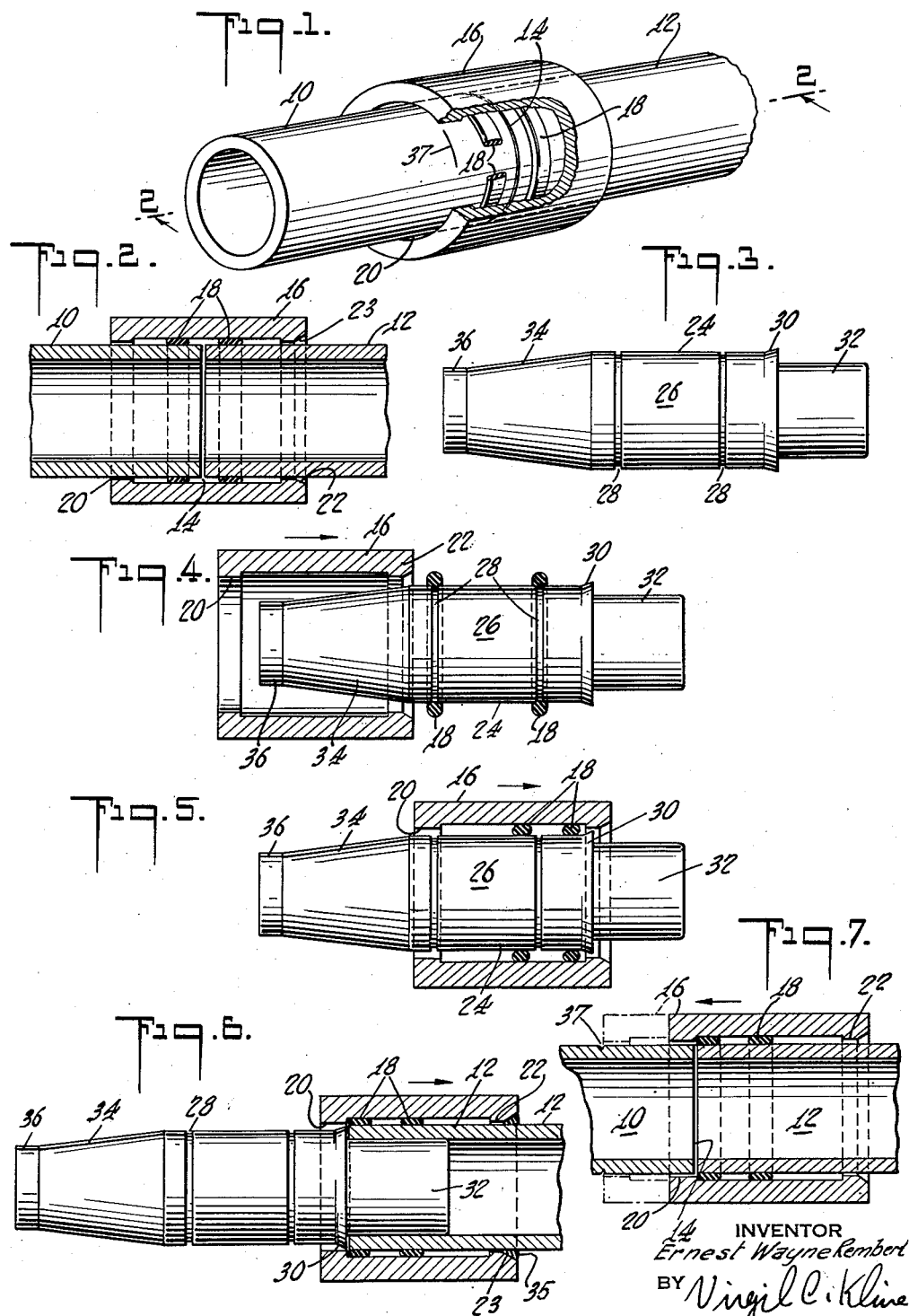
INVENTOR
Ernest Wayne Rembert
BY Virgil C. Kline
ATTORNEY Patented Sept. 7, 1943

2,329,000

UNITED STATES PATENT OFFICE 2,329,000

PIPE COUPLING AND METHOD OF MAKING THE SAME

Ernest Wayne Rembert, Plainfield, N. J., assignor to Johns-Manville Corporation, New York, N. Y., a corporation of New York Application July 17, 1940, Serial No. 345,873

12 Claims. (Cl. 29—88.2)

The instant invention relates to a pipe coupling and method of making the same, and particularly a pipe coupling which, though adapted for use with any suitable pipe, finds its principal field of use in the connecting of pipe sections composed of a hardened, compressed, asbestos-cement composition.

Heretofore, pipe couplings have been employed particularly for use with asbestos-cement pipe as referred to above, such couplings comprising a sleeve surrounding the adjacent ends of the pipe sections. In this construction the space between the pipe sections and sleeve is closed by suitable compressible gaskets of rubber or the like on opposite sides of the joint. The instant invention has for its principal object the provision of an improved pipe coupling of this general type, and particularly is directed to the provision of a coupling which, as compared to those referred to above, has greater strength, better resistance to gasket failure, and provides for easier and more positive assembly in the field, whereby failures due to carelessness or lack of skill on the part of the field crew are eliminated.

Another object of the invention is the provision of a coupling and method of assembly, in which the major steps of the assembly may be made at the shop or factory prior to shipment of the pipe to the job.

A further object of the invention is the provision of improved methods of coupling pipe sections.

My invention will be more fully understood and further objects and advantages thereof will become apparent when reference is made to the more detailed description thereof which is to follow and to the accompanying drawing, in which:

Fig. 1 is a perspective view, with parts broken away, of a pipe coupling in accordance with the invention;

Fig. 2 is a sectional view taken on the line 2—2 of Fig. 1;

Fig. 3 is an elevational view of an assembly member for use in the invention; and Figs. 4, 5, 6, and 7 are views, partly in elevation and partly in section, illustrating steps in the method of making the pipe coupling assembly of the instant invention.

Referring now to the drawing, and particularly to Figs. 1 and 2, there is shown pipe sections 10 and 12, which may be cast iron, steel, or other material, but are preferably formed of hardened, compressed, asbestos-cement composition inasmuch as the invention finds its greatest field of use in connection with pipe of this character. Pipe sections 10 and 12 are arranged in axial alinement and in substantially endwise contiguous relationship to form a joint 14 therebetween. Surrounding the ends of the pipe at and adjacent the joint is a sleeve 16, which is preferably also formed of a hardened, compressed, asbestos-cement composition, although any suitable material may be used. Between the sleeve and the pipe ends and on opposite sides of the joint, but preferably adjacent thereto, are compressed annular ring gaskets 18. The gaskets are made of a compressible, destruction-resistant material and suitably comprise a rubber compound. Sleeve 16 includes flanges 20 and 22 at the opposite ends thereof which project toward the pipe, leaving only sufficient clearance to permit some angular adjustment of the pipe sections with respect to one another. However, the clearance between the flanges and the pipe sections is insufficient to permit passage of gaskets 18. For example, the clearance between the flanges and pipe sections should be approximately 0.1 inch where the clearance between the pipe sections and the interior surface of the sleeve proper is, say, from 0.20 to 0.35 inch. Flange 22 is tapered at its outer end, as indicated at 23, for a purpose hereinafter referred to. As will be observed, the provision of the flanges 20 and 22 on the sleeve 16, extending adjacent the pipe surface with insufficient clearance to permit blowing out of the gaskets, substantially eliminates the possibility of gasket failure.

In making the pipe coupling as described above, there is employed an assembly member or plug 24, as disclosed in Fig. 3. Assembly member 24, which may be solid or hollow and which may be made of any suitable material, comprises a main cylindrical portion 26 of substantially smaller diameter than the exterior diameter of the pipe with which it is to be employed. The main portion 26 includes spaced shallow grooves 28 and at one end thereof a ramp 30, the major diameter of which is substantially equal to the outer diameter of the pipe. Extending beyond ramp 30 is a cylindrical projecting section 32 in axial alinement with the main portion and of a diameter substantially equal to the interior diameter of the pipe, whereby the same may be inserted within the pipe to hold the assembly member in position. The opposite end of the assembly member includes inclined frusto-conical section 34 and cylindrical section 36 to permit gasket members 18, which when unstressed are of smaller diameter than portion 26, to be placed thereon and readily forced or rolled up the conical section and onto the main section 26.

As the first step in making the coupling assembly, member 24 is supported in any suitable manner, for example, it may be supported by inserting projecting end 32 within a pipe section which is to be coupled, or a chuck or like device may be used. Ring gaskets 18 are then mounted on the frusto-conical section of the assembly member and rolled or forced into the positions determined by grooves 28. The assembly member carrying the gaskets 18 is then inserted within a sleeve 16, preferably by moving the sleeve over member 24 in the direction indicated by the arrow (see Fig. 4), the gaskets readily passing under shoulder 22 due to the reduced size of portion 26 as compared to the diameter of the pipe with which the sleeve is later to be assembled. The diameter of the rings and the relative diameters of portion 26 and sleeve 16 are so arranged that the rings are in substantial frictional contact with the interior of the sleeve during relative axial movement of the member and sleeve, whereby they are picked up from the shallow grooves 28 and rolled along the assembly member by such relative movement, as indicated particularly in Fig. 5. Bevel 23, on the forward end of sleeve 16, acts to insure entry of the ring between the sleeve and member 24 to prevent any tendency of the ring to push ahead of the sleeve.

When the sleeve is on the assembly member in the position indicated in Fig. 5, the projecting end 32 of the assembly member, if it was not previously mounted in the end of a pipe section, is so positioned and the movement of the sleeve continued in the direction indicated by the arrow (see Fig. 6), gaskets 18 rolling up ramp 30 and onto the end of pipe section 12 and being compressed between the sleeve and pipe and confined by flanges 20 and 22. Movement of the sleeve 16 is continued until the rear gasket 18 meets the shoulder formed by flange 20. The grooves 28 of the assembly member are so located that when the assembly has reached the stage of Fig. 6, the gaskets will be positioned substantially as shown. At this stage and under ideal conditions, the inside edge of flange 20 should exactly line up with the end of the pipe. However, slight variations in the pipe and sleeve diameters may result in a small portion of the ring overhanging the pipe or in the sleeve riding up the pipe until a portion of the shoulder is beyond the pipe end, without adversely affecting the assembly.

The assembly steps described above are preferably performed in the factory or shop under the more favorable conditions there prevailing. Thereafter, the pipe sections, each carrying a coupling sleeve mounted on one end thereof in the manner described above, are shipped to the job and the coupling assembly completed as will be hereafter described. To prevent dirt from lodging beneath the end of the coupling, a rubber ring dirt guard 35 may be temporarily positioned to close the space between the pipe section and sleeve at the forward end of the latter, as shown in Fig. 6.

In the field assembly, the pipe sections to be coupled are placed in axial alinement and in substantially endwise contiguous relationship, as indicated in Fig. 7, and coupling member 16 drawn endwise over the joint 14 therebetween with simultaneous rolling of the gaskets until the gaskets are spaced substantially equidistant on opposite sides of the joint whereby the completed coupling, as disclosed in Figs. 1 and 2, is obtained. Suitably, the end of the pipe section 10 onto which the pipe coupling is drawn in the field is previously scored or otherwise marked, as shown at 37, to indicate the limit of movement of the coupling sleeve in the direction indicated by the arrow in Fig. 7, to accurately position the gaskets 18 at the desired points on opposite sides of the joint.

The method of assembly described above permits the major operations to be performed in the factory or shop where the more ideal conditions are present. The completion of the assembly in the field requires merely the placing of the pipe sections in axial alinement and endwise contiguous relationship and the drawing of the coupling sleeve 16 onto the pipe section 10 until the mark 37 is reached. Referring to Fig. 7, it will be noted that the extension of the flange 20 of the sleeve 16 beyond the end of pipe section 12 forms a socket to receive the end of pipe section 10, whereby proper alinement of the pipe sections is insured with minimum effort. For these reasons, the possibility of carelessness or lack of skill on the part of the field crew, resulting in coupling failure, is eliminated or at least substantially reduced.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. The method of making a pipe assembly comprising locating gaskets in spaced relationship on an assembly member of smaller diameter than the pipe, inserting the member within a coupling sleeve with the gaskets confined between the member and sleeve, drawing the sleeve from the member over an end of a pipe section with the gaskets rolling onto said section, placing a second pipe section in axial alinement with said first section, and shifting said sleeve to span the joint between said sections.

2. The method of making a pipe assembly comprising inserting an assembly member of generally smaller diameter than the pipe and carrying spaced ring gaskets, within a coupling sleeve, with the gaskets in frictional contact with the sleeve, drawing the sleeve from the member over the end of a pipe section with simultaneous rolling of the gaskets onto said section, placing a second pipe section in axial alinement with said first section, and drawing the sleeve over the joint between said sections until said gaskets are positioned on opposite sides of said joint.

3. The method of making a pipe assembly comprising inserting an assembly member of generally smaller diameter than the pipe but including an annular ramp at one end thereof and carrying spaced ring gaskets, within a coupling sleeve, with the gaskets in frictional contact with said sleeve, drawing the sleeve from said member over the end of a pipe section with simultaneous rolling of said gaskets over said ramp and onto said pipe section, removing the assembly member, placing a second pipe section in axial alinement with said first section, and drawing the said sleeve over the joint between the sections until the gaskets are positioned on opposite sides of said joint.

4. The method of making a pipe assembly comprising installing ring gaskets in spaced relationship on an assembly member of generally smaller diameter than the pipe but including an annular ramp at one end thereof, inserting said assembly member within a coupling sleeve including inwardly extending flanges at the ends thereof, drawing the sleeve from said member over the end of a pipe section and simultaneously rolling said gaskets over said ramp and onto said pipe section, removing the assembly member, placing a second pipe section in axial alinement with said first section, and drawing said sleeve over the joint between said sections with simultaneous rolling of said gaskets until the gaskets are positioned on opposite sides of said joint.

5. The method of making a pipe assembly comprising locating annular gaskets in spaced relationship on an assembly member of smaller diameter than the pipe, inserting the member within a coupling sleeve with the gaskets confined between the member and sleeve, drawing the sleeve from the member over an end of a pipe section with the gaskets rolling onto said section, placing a second pipe section in axial alinement with said first section, and drawing the sleeve over the joint therebetween until the forward end of said sleeve alines with indicia on said second section.

6. The method of mounting a coupling sleeve on a pipe section comprising locating ring gaskets in spaced relationship on an assembly member of generally smaller diameter than the pipe, inserting the member within a coupling sleeve with the gaskets in frictional contact with the sleeve, and drawing the sleeve from the member over the pipe section.

7. The method of mounting a coupling sleeve on a pipe comprising locating ring gaskets in spaced relationship on an assembly member of generally smaller diameter than the pipe but including an annular ramp at one end thereof, inserting said assembly member within a coupling sleeve, including inwardly extending flanges at the ends thereof, and drawing the sleeve from the member over the pipe section with simultaneous rolling of said gaskets over said ramp and onto said pipe section.

8. The method of mounting a coupling sleeve on a pipe comprising locating ring gaskets in spaced relationship on an assembly member of generally smaller diameter than the pipe but including an annular ramp at one end thereof with a major diameter substantially that of the pipe, inserting said member within a coupling sleeve including inwardly extending flanges at the ends thereof, drawing the sleeve from said member over the end of a pipe section, and simultaneously rolling said gaskets over said ramp and onto said pipe section until the rearmost of the rings comes into contact with the flange of said sleeve.

9. An assembly member for mounting a coupling sleeve on a pipe section, comprising a main portion of smaller diameter than the pipe, means on said portion for denoting the initial positions of annular gaskets employed in the assembly, and an annular ramp at one end of said main portion, said ramp having an end diameter substantially equal to the diameter of said pipe section.

10. An assembly member for mounting a coupling sleeve on a pipe section, comprising a main portion of smaller diameter than the pipe, means on said portion for denoting the initial positions of annular gaskets employed in the assembly, and a section in axial alinement with said main portion and projecting from one end thereof, said section being of a diameter to fit within said pipe section.

11. An assembly member for mounting a coupling sleeve on a pipe section, said member comprising a main portion of smaller diameter than the pipe, means on said portion for denoting the initial positions of annular gaskets employed in the assembly, an annular ramp at one end of said main portion, said ramp having an end diameter substantially equal to the diameter of said pipe section, and a section in axial alinement with said main portion and projecting axially from the end of said main portion carrying said ramp, said section being of a diameter to fit within said pipe section.

12. An assembly member for mounting a coupling sleeve on a cylindrical pipe section, said member comprising a main cylindrical portion of smaller diameter than the pipe, means on said portion for denoting the initial positions of annular gaskets employed in the assembly, an annular ramp on one end of said main portion, said ramp having an end diameter substantially equal to the diameter of said pipe section, a cylindrical section in axial alinement with said main portion and projecting axially from the end of said portion carrying said ramp, said section being of a diameter to fit within said pipe section, and a frusto-conical section extending from the opposite end of said main portion, the base of said frusto-conical section adjoining said main portion and being of equal diameter therewith.

ERNEST WAYNE REMBERT.